United States Patent [19]

Hawkins et al.

[11] 4,229,649
[45] Oct. 21, 1980

[54] PHOTO ELECTRICALLY PROGRAMMED STEERING CONTROL

[75] Inventors: Royal R. Hawkins, Bloomington; Leland E. Kuntz, Edina, both of Minn.

[73] Assignee: Honeywell Inc., Minneapolis, Minn.

[21] Appl. No.: 957,957

[22] Filed: Nov. 6, 1978

[51] Int. Cl.² .................................. B62D 5/00
[52] U.S. Cl. .................................. 250/215; 180/79.1; 250/209
[58] Field of Search .............. 250/215, 211 K, 209; 180/79.1, 131

[56] References Cited

U.S. PATENT DOCUMENTS

| | | |
|---|---|---|
| 2,411,570 | 11/1946 | Hawkins . |
| 2,756,066 | 7/1956 | Ludowici . |
| 2,916,099 | 12/1959 | Bergmann et al. . |
| 3,235,283 | 2/1966 | Voghel . |
| 3,280,931 | 10/1966 | Cahill et al. . |
| 3,314,690 | 4/1967 | Bunchak . |
| 3,387,684 | 6/1968 | Belke et al. . |
| 3,532,178 | 10/1970 | Lindbom . |
| 3,572,458 | 3/1971 | Tax . |
| 3,696,881 | 10/1972 | Gordon . |
| 3,933,215 | 1/1976 | Scheuerle . |
| 3,933,218 | 1/1976 | Oler et al. . |
| 4,008,783 | 2/1977 | Hermann et al. . |

FOREIGN PATENT DOCUMENTS 719235  4/1942  Fed. Rep. of Germany .

*Primary Examiner*—David C. Nelms
*Assistant Examiner*—Darwin R. Hostetter
*Attorney, Agent, or Firm*—Trevor B. Joike

[57] ABSTRACT

A steering system is disclosed for steering the wheels or tracks of a vehicle, the system having an optical control apparatus for controlling the steering of the wheels or tracks, the optical control apparatus being profiled optically so that, in the turn, the steerable wheels or tracks are steered around a common center.

17 Claims, 4 Drawing Figures

PHOTO ELECTRICALLY PROGRAMMED STEERING CONTROL

BACKGROUND OF THE INVENTION

This invention relates to steering of wheeled or tracked vehicles and, in particular, to insuring that each of the wheels or tracks are steered about a common center when it is desired to turn the vehicle.

The conventional method of steering the ground engagement means, which may be the tracks or wheels of a vehicle, over different radii, but where the radii have a common center or intersection point, is to use tie rods interconnecting the wheels or tracks of the vehicle. However, there are many types of vehicles which do not permit the use of mechanical linkages for making these adjustments. For example, gantry cranes are built with a clearance between the wheels upon which the crane is propelled so that the crane may bridge the articles which it is transporting. Tie rods would interfere with the operation of the crane insofar as they would make it impossible for the crane to move over these articles. The present invention is particularly useful, therefore, on those vehicles where tie rods are inappropriate to the proper functioning or utilization of the vehicle. Moreover, the present invention allows a much more flexible arrangement for providing the tie rod function without using the mechanical tie rods which are subject to the normal difficulties associated with mechanical arrangements.

The prior art has sought various systems to solve the problem of eliminating tie rods yet retaining the tie rod function. Various mechanical arrangements, other than tie rods, have been devised for insuring that the wheels on opposite sides of a vehicle will turn about a common center but these systems suffer the same mechanical failure problems of the tie rod systems. Other systems rely upon complex diode and resistance bridges for approximating the desired turning radii for the wheels or tracks of the vehicle but these systems are merely approximations and do not accurately reflect the optimum turning radius for each of the wheels or tracks. Still other systems rely upon complex cam arrangements wherein a separate cam is devoted to each wheel or track of the vehicle to be steered and is profiled to insure that the associated wheel turns with the proper radius regardless of the direction or to the degree to which the vehicle is turned. These cam type arrangements are mechanical in nature insofar as a cam follower must sense the surface of the cam resulting in wearing of the follower and friction between the follower and the cam. The present invention eliminates these disadvantages while providing an effective and reliable steering control.

BRIEF DESCRIPTION OF THE DRAWINGS

These and other features and advantages will become apparent from a detailed consideration of the invention when taken in conjunction with the drawings in which.

DETAILED DESCRIPTION

Figure 1:
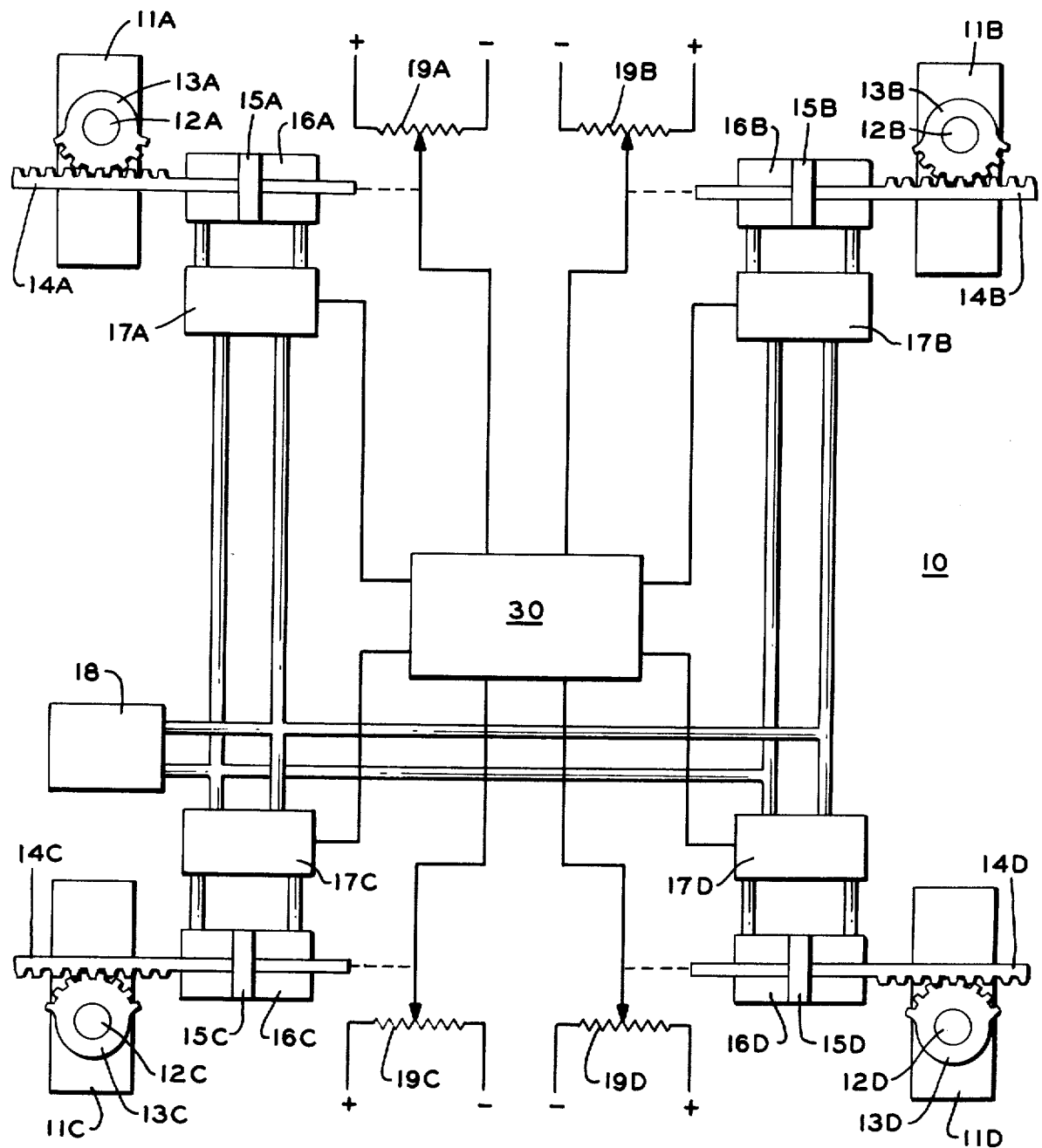
FIG. 1 is a drawing showing the apparatus necessary to steer the vehicle in accordance with the invention.

In FIG. 1, vehicle 10 has four steerable ground engagement means, which may be tracks or wheels, 11A-11D, for steering and driving the vehicle 10 along its direction of travel. Each of the ground engagement means 11A-11D is steerable about a respective vertical axis 12A-12D and has associated therewith respective gears 13A-13D which, together with corresponding racks 14A-14D turn ground engagement means 11A-11D around their axis 12A-12D. Racks 14A-14D are extensions of pistons 15A-15D contained within hydraulic motors or cylinders 16A-16D. Pistons 15A-15D are moved by the hydraulic pressure differential across these pistons within cylinders 16A-16D. This hydraulic pressure is supplied by respective valves 17A-17D each of which is controlled by an output from controller 30. Each valve 17A-17D is supplied with hydraulic fluid from pump 18. To insure that each piston 15A-15D is in its proper linear orientation, each piston is connected to a wiper arm of corresponding potentiometers 19A-19D. These wiper arms provide separate electrical inputs to controller 30 as shown.

Figure 2:
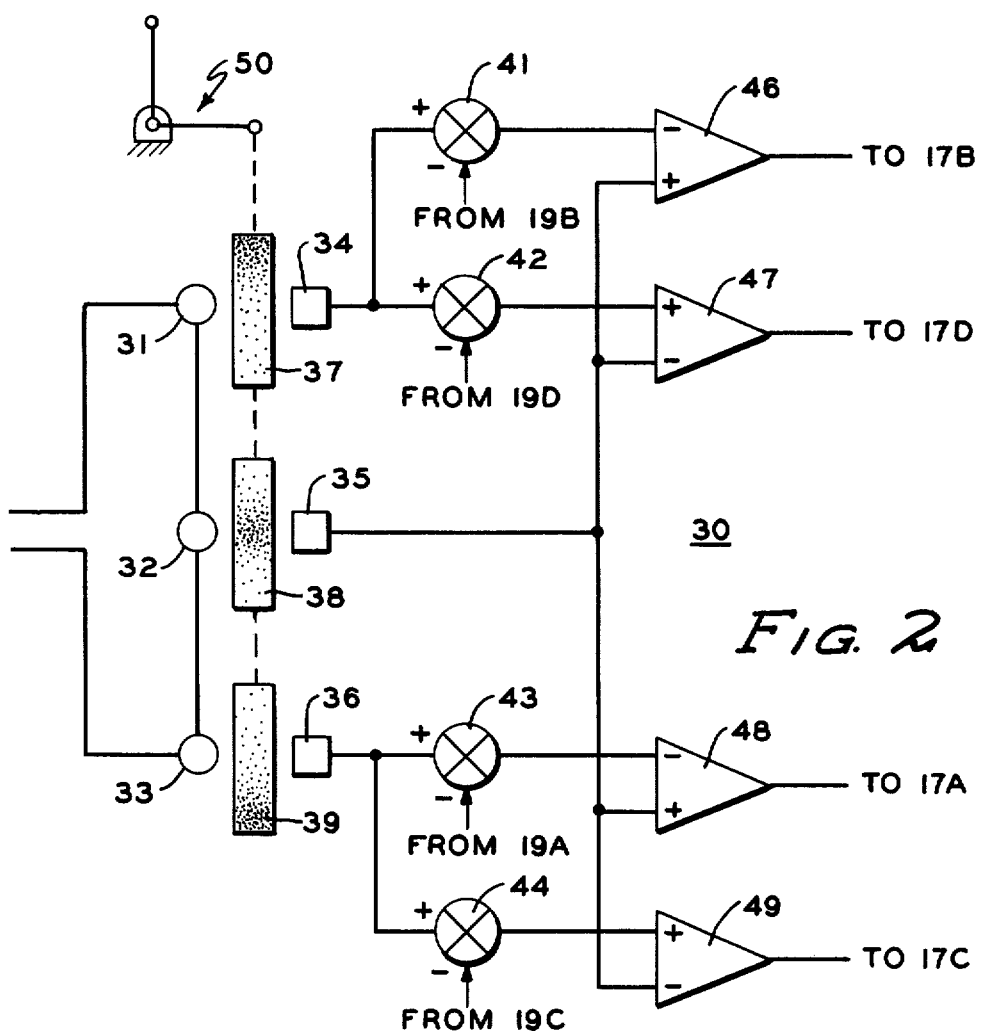
FIG. 2 is a detailed drawing showing the contents of the control apparatus 30 shown in FIG. 1; and, FIGS. 3 and 4 show the vehicle turning counterclockwise and clockwise respectively wherein the wheels or tracks of the vehicle have common centers of turning.

Controller 30 is shown in more detail in FIG. 2 and comprises a plurality of lights 31-33 forming a light source means. Optical sensor 34 cooperates with light source 31, sensor 35 cooperates with light source 32 and sensor 36 cooperates with light source 33. Each of the sensors provides an output the magnitude of which will depend upon the amount of light received from corresponding light sources 31-33. Mounted between each light source and its corresponding sensor is a variable transmissive window 37, 38 and 39 having an optical profile selected to steer the wheel associated therewith about the desired radius depending upon the direction of turn. Sensor 34 is connected to one input of each of summing junctions 41 and 42. Summing junction 41 receives a second input from the wiper arm of feedback potentiometer 19B and summing junction 42 receives a second input from the wiper arm of feedback potentiometer 19D. Sensor 36 is connected to summing junctions 43 and 44. Summing junction 43 receives a second input from the wiper arm of feedback potentiometer 19A and summing junction 44 receives a second input from the wiper arm of feedback potentiometer 19C.

The output of summing junction 41 is connected to the negative input of amplifier 46 whereas the output from summing junction 42 is connected to the positive input of amplifier 47. This arrangement is desired in order to produce the opposite steering affect on the wheels of one side of the vehicle. For example, when it is desired to turn left, ground engagement means 11A and 11B are rotated counterclockwise but ground engagement means 11C and 11D are rotated clockwise. Such opposite action between 11A-11B and 11C-11D is assured since the output from sensor 34 is connected to opposite inputs of its associated amplifiers and the output from sensor 36 is connected to opposite inputs of its associated amplifiers. As shown, the output from summing junction 43 is connected to the negative input of amplifier 48 and the output from summing junction 44 is connected to the positive input of amplifier 49.

Variable light transmissive windows 37, 38 and 39 are all mechanically connected together to be operated by a steering lever 50. The arrangement of light sources 31-33, light sensors 34-36 and windows 37-39 together with the control handle 50 may take the general form shown in copending patent application Ser. No. 910,043 filed on May 26, 1978 and having the same assignee as this invention. The optical control handle disclosed therein may be easily modified for providing a third variably light transmissive window to form the reference sensor as disclosed herein and for insuring that all windows are simultaneously active rather than separately active as shown in that application. The reference sensor 35 is connected to the second or other inputs of amplifiers 46–49. Window 38 may be profiled as desired so that temperature effects on sensors 34–36 are minimized or may be eliminated with the other inputs of amplifiers 46–49 connected to an appropriate resistance bridge for providing corresponding set points.

Figure 3:
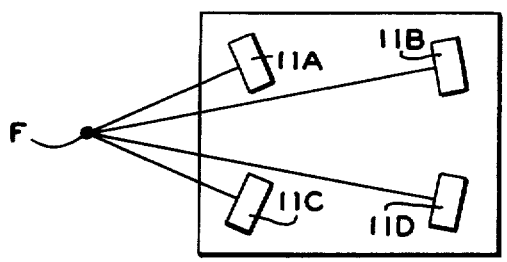
Figure 4:
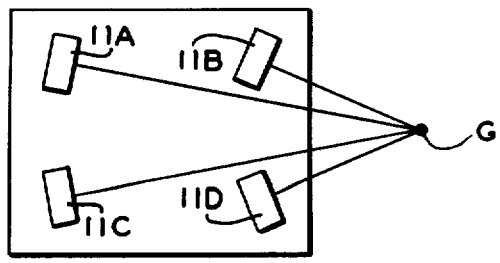

As shown in FIG. 3, a left hand turn results in ground engagement means 11A and 11B being rotated or steered counterclockwise and ground engagement means 11C and 11D being rotated or steered clockwise. However, the center of rotation of wheels 11A and 11C must be the same as the center of rotation of 11B and 11D to prevent skidding of either the inside or outside ground engagement means. This common center is represented by point F in FIG. 3. In a right hand turn, just the opposite action must be taken such that the ground engagement means 11A and 11C must have the same center of rotation as the ground engagement means 11B and 11D. This point is represented by point G in FIG. 4.

When the vehicle is to be turned into a left hand turn as shown in FIG. 3, steering lever 50 is operated to increase the opacity of window 37 between source 31 and sensor 34 while at the same time decreasing the opacity between light source 33 and sensor 36. Thus, the output from sensor 34 decreases while the output from sensor 36 increases. A decreasing output from sensor 34 will result in an increasing output from amplifier 46 and a decreasing output from amplifier 47. An increasing output from sensor 36 results in a decreasing output from amplifier 48 and an increasing output from amplifier 49. Valve 17B is connected to cylinder 16B in such a manner that an increasing output from amplifier 46 will drive rack 14B in a direction to rotate ground engagement means 11D in a counterclockwise direction. Likewise, valve 17D is connected to cylinder 16D in such a manner that a decreasing output from amplifier 47 drives rack 14D in a direction to rotate ground engagement means 11D in a clockwise direction. Valves 17A and 17C are similarly arranged for providing similar rotation of ground engagement means 11A and 11C as shown in FIG. 3.

As rack 14B moves in a direction to rotate ground engagement means 11B in a counterclockwise direction, the signal on wiper arm potentiometer 19B increases to balance the decreasing input to summing junction 41. Similarly, the decreasing input to summing junction 42 from light sensor 34 is balanced by an increasing signal from the wiper arm of potentiometer 19D. The increasing inputs to summing junctions 43 and 44 from light sensor 36 are balanced by corresponding decreasing inputs from the feedback potentiometers 19A and 19C.

As shown in FIG. 2, the opacity of the variable light transmissive windows 37 and 39 vary from dark at one end of the window to light at the other end of the window. The gradation of change between light and dark is selected to give the desired steering rotation of ground engagement means 11A–11D depending upon the sharpness of the turn to be made. Specifically, points F and G will vary, although they will remain the common center point for all ground engagement means, depending upon the sharpness of the turn. The profile or gradation of the variable light transmissive windows 37 and 39 is selected to provide the common steering center movable dependent upon the sharpness of the turn. The variable light transmissive window 38 may be uniform from one end to the other to provide the desired reference to amplifiers 46–49 but may be varied in order to characterize the turn as desired. Instead of the reference light source 32, the reference light sensor 35 and the reference light transmissive window 38, the second inputs to amplifiers 46–49 may be connected to an appropriate resistance bridge. Other variations may be made with respect to the device shown in FIGS. 1–4 without departing from the scope of the invention and, therefore, the invention is to be limited only by the claims.

The embodiments of the invention in which an exclusive property or right is claimed are defined as follows:

1. A steering system for a vehicle, the vehicle having at least two steerable ground engagement means, one on each side of the vehicle, said steering system comprising:
   steering control means adapted to steer said two steerable ground engagement means; and,
   optical control means connected to said steering control means, said optical control means being optically profiled so that, in a turn, both said two steerable ground engagement means are steered about a common center.

2. The system of claim 1 wherein said optical control means comprises light source means, light sensor means, and light control means interposed between said light source means and said light sensor means, said light sensor means being connected to said steering control means, said light control means being profiled with variable opacity such that, in a turn, both said two steerable ground engagement means are steered around a common center.

3. The system of claim 2 wherein said light control means comprises a variable light transmissive window.

4. The system of claim 2 wherein said light control means comprises first and second variably light transmissive windows.

5. The system of claim 4 wherein said light sensor means comprises first and second sensors, said first sensor associated with said first variable light transmissive window and said second sensor associated with said second variable light transmissive window, said first sensor connected to said steering control means for controlling one of said two steerable ground engagement means and said second sensor connected to said steering control means for controlling the other of said two steerable ground engagement means, said first and second variable light transmissive windows being profiled so that, in turn, both said two steerable ground engagement means are steered around a common center.

6. The system of claim 5 wherein said steering control means comprises first and second amplifiers, first connecting means connecting said first amplifier to said first sensor and second connecting means connecting said second amplifier to said second sensor.

7. The system of claim 6 wherein said first connecting means comprises a first summing junction and said second connecting means comprises a second summing junction, said first summing junction having a first input connected to said first sensor and a second input connected to a feedback potentiometer which senses the turning of said one of said two ground engagement means, said second summing junction having a first input connected to said second sensor and a second input connected to a feedback potentiometer for sensing the turning of said other of said two steerable ground engagement means.

8. The system of claim 7 wherein said first and second amplifiers have a second input each, said second input of each being connected to a third sensor having a third reference variable light transmissive window operated in conjunction with said first and second variable light transmissive windows and controlling the light falling on said third sensor from said light source means.

9. A steering system for a vehicle, the vehicle having front and back, left and right steerable ground engagement means, said steering system comprising:
   steering control means adapted to steer said front and back, right and left steerable ground engagement means; and,
   optical control means connected to said steering control means, said optical control means being optically profiled so that, in a turn, said front and back, right and left ground engagement means are steered around a common center.

10. The system of claim 9 wherein said optical control means comprises light source means, light sensor means and light control means interposed between said light source means and said light sensor means, said light sensor means having an output dependent upon the amount of light received through said light control means from said light source means, said light control means being profiled such that, in a turn, said front and back, right and left ground engagement means are steered around a common center.

11. The system of claim 10 wherein said light control means comprises a variable light transmissive window.

12. The system of claim 11 wherein said light control means comprises first and second variable light transmissive windows.

13. The system of claim 12 wherein said light sensor means comprises first and second sensors, said first sensor associated with said first variable light transmissive window and said second sensor associated with said second variable light transmissive window, said first sensor connected to said steering control means for controlling said front and back, right steerable ground engagement means and said second sensor connected to said steering control means for controlling said front and back, left steerable ground engagement means, said first and second variable light transmissive windows being profiled so that, in a turn, said front and back, right and left steerable ground engagement means are steered around a common center.

14. The system of claim 13 wherein said steering control means comprises first, second, third and fourth amplifiers, first means connecting said first and second amplifiers to said first sensor and second connecting means connecting said third and fourth amplifiers to said second sensor.

15. The system of claim 14 wherein said first connecting means comprises first and second summing junctions and said second connecting means comprises third and fourth summing junctions, said first summing junction having a first input connected to said first sensor, a second input connected to a feedback potentiometer which senses the turning of said front, right steerable ground engagement means, and an output connected to one input of said first amplifier, said second summing junction having a first input connected to said first sensor, a second input connected to a potentiometer for sensing the turning of said back, right steerable ground engagement means and an output connected to one input of said second amplifier, said third summing junction having a first input connected to said second sensor, a second input connected to a feedback potentiometer which senses the turning of said left, front steerable ground engagement means, and an output connected to one input of said third amplifier, and said fourth summing junction having a first input connected to said second sensor, a second input connected to a feedback potentiometer which senses the turning of said left, back steerable ground engagement means, and an output connected to one input of said fourth amplifier.

16. The system of claim 15 wherein said first, second, third and fourth amplifiers have a second input each, said second input of each being connected to a third sensor having a third reference variable light transmissive window operated in conjunction with said first and second variable light transmissive windows and controlling the light falling on said third sensor from said light source means.

17. A steering system for a vehicle, the vehicle having at least two steerable ground engagement means, one on each side of the vehicle, said steering system comprising:
   first and second steering control means adapted to steer a corresponding one of said two steerable ground engagement means; and,
   optical control means having light source means, light sensor means, and light control means interposed between said light source means and said light sensor means, said light sensor means connected to said first and second steering control means and having an output dependent upon the amount of light received through said light control means from said light source means, said light control means being profiled such that, in turn, both said two steerable ground engagement means are steered around a common center.

* * * * *